United States Patent Office 2,926,173
Patented Feb. 23, 1960

---

2,926,173

PREPARATION OF β,γ-SUBSTITUTED-γ-LACTONES

Tracy M. Patrick, Jr., Melrose, Mass., and Floyd B. Erickson, Dayton, Ohio, assignors to Monsanto Chemical Company, St. Louis, Mo., a corporation of Delaware No Drawing. Application December 23, 1953
Serial No. 400,085

8 Claims. (Cl. 260—343.6)

This invention relates to the preparation of γ-alkyl-β-carbalkoxy-γ-lactones in high yield by the hydrogen reduction of dialkyl acylsuccinates under superatmospheric pressures and at elevated temperatures in the presence of nickel catalysts.

Gamma-lactones have been prepared by numerous procedures as, for example, the intramolecular esterification of hydroxy acids, the cyclization of olefinic acids, the cyclization of halo acids, and the dehydrogenation of specific diols (Wagner and Zook, Synthetic Organic Chemistry, John Wiley and Sons, Inc., New York, pp. 533 to 541: 1953). Related γ-lactones have also been prepared by the reaction of an α-acylsuccinic acid ester with an aldehyde, Ladd and Paxton, U.S. Patent 2,598,803.

It has now been found that γ-alkyl-β-carbalkoxy butyrolactones can be obtained in substantially quantitative yield by the hydrogen reduction of dialkyl acylsuccinates in the presence of a nickel catalyst, preferably a catalytic amount of Raney nickel, wherein the process is effected under superatmospheric pressures and at a temperature of at least about 110° C. The subject preparation is generically shown by the equation:

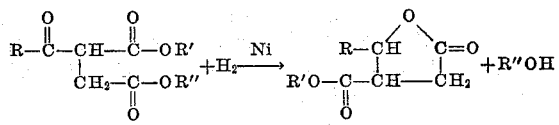

wherein R, R', and R'' are alkyl radicals containing up to 20 carbon atoms and more preferably are selected from the lower alkyl radicals which contain up to 8 carbon atoms. Thus, suitable alkyl radicals are, for example, methyl, ethyl, propyl, butyl, hexyl, octyl, 2-ethylhexyl, decyl, dodecyl, tetradecyl, hexadecyl, octadecyl, and the like.

The dialkyl acylsuccinates can be readily obtained by the general method shown in Blatt, Organic Synthesis, Collective vol. 2, pp. 262-3 (1943) John Wiley and Sons, Inc., New York, or by the method shown in U.S. Patent 2,577,133 and the application of T. M. Patrick, Jr. et al., Serial No. 135,829, filed December 29, 1949, now abandoned, or other suitable methods.

Representative dialkyl acylsuccinates which can be employed in the instant process and the substituted γ-lactones obtained therefrom are:

diethyl butyrylsuccinate yields β-carbethoxy-γ-heptanolactone,
diethyl acetylsuccinate yields β-carbethoxy-γ-valerolactone,
diethyl heptanoylsuccinate yields β-carbethoxy-γ-decanolactone,
diethyl (2-ethylhexanoyl)succinate yields β-carbethoxy-δ-ethyl-γ-nonanolactone,
dihexyl butyrylsuccinate yields β-carbohexoxy-γ-heptanolactone,
di-2-ethylhexyl butyrylsuccinate yields β-(carbo-2-ethylhexoxy)-γ-heptanolactone,
ditetradecyl butyrylsuccinate yields β-carbotetradecoxy-γ-heptanolactone,
di-2-ethylhexyl heptanoylsuccinate yields β-(carbo-2-ethylhexoxy)-γ-decanolactone,
dioctadecyl acetylsuccinate yields β-carboctadecoxy-γ-valerolactone,
dimethyl octadecanoylsuccinate yields β-carbomethoxy-γ-docosanolactone,
dibutyl acetylsuccinate yields β-carbobutoxy-γ-valerolactone,
diethyl nonanoylsuccinate yields β-carbethoxy-γ-dodecanolactone,
dimethyl (3,5-dimethyl-octanoyl)succinate yields β-carbomethoxy-ε,η-dimethyl-γ-hendecanolactone,
diethyl (3,5,5-trimethylhexanoyl)succinate yields β-carbethoxy-ε,η,η-trimethyl-γ-nonanolactone,
dibutyl octanoylsuccinate yields β-carbobutoxy-γ-hendecanolactone,
dipropyl (2-methyl-heptanoyl)succinate yields β-carbopropoxy-δ-methyl-γ-decanolactone,
dibutyl hexanoylsuccinate yields β-carbobutoxy-γ-nonanolactone,
diethyl decanoylsuccinate yields β-carbethoxy-γ-tridecanolactone,
dimethyl dodecanoylsuccinate yields β-carbomethoxy-γ-pentadecanolactone,
diethyl (2-methylpentanoyl)succinate yields β-carbethoxy-δ-methyl-γ-octanolactone, and the like.

It was found that the concentration of nickel catalyst could be varied over a range of from about 3 to about 16 weight percent based on the dialkyl acylsuccinate. The choice of catalyst concentration will be dependent on the quantity of dialkylacylsuccinate employed and the other processing conditions, however, concentrations of from about 3 to about 8 weight percent are generally preferred.

The reaction temperature can range from about 110° C. up to a temperature below the decomposition point of the specific reactant and reaction product and preferably ranges from about 110° C. to about 200° C. and more preferably still, from about 110° C. to about 150° C.

The pressure of the reaction of the instant invention can be varied over a considerable range of superatmospheric conditions. Processing in an autoclave is preferred wherein pressures up to about 5000 p.s.i. and higher can be employed. The lower range of pressure selected should be such that the quantity of hydrogen present is theoretically sufficient to convert substantially all of the dialkyl acylsuccinate to the γ-lactone. Generally, it is preferred that the autoclave be pressured to at least about 1000 to about 2000 p.s.i. at room temperature and subsequently heated up to the selected reaction temperature for a sufficient time to provide substantial yields of the desired γ-lactone. However, relatively low pressure systems also can be employed, e.g., about 50 to 100 p.s.i., wherein additional hydrogen is admitted to the vessel throughout the reaction to maintain a substantially constant pressure until the reaction is substantially complete.

A suitable reaction time, temperature, pressure, and concentration of nickel catalyst, are readily selected from the disclosed range of variables by one skilled in the art in view of the fact that the rate of hydrogenation is generally somewhat interdependent on the aforesaid variables. Thus, within limits, for a given set of conditions the higher temperatures, pressures, and catalyst concentrations will favor a more rapid conversion of the dialkyl acylsuccinate to the γ-lactone.

The reaction can be effected directly on the dialkyl acylsuccinate, but can be modified by the presence of an inert solvent, as for example, ethanol, which acts as a diluent and improves the fluidity of the reaction mixture to provide effective suspension of the catalyst in the system.

Upon termination of the reaction, the reaction mixture can be allowed to cool slowly or can be cooled rapidly to about room temperature, or higher, by any suitable means. The pressure vessel is then vented and the reaction mixture removed therefrom. The desired γ-lactone is then obtained from the reaction mixture by fractional distillation or other suitable procedures.

The following example is illustrative of the invention.

A 1-liter rocking autoclave was charged with 216 g. (1.0 mole) of diethyl acetylsuccinate, 100 ml. of ethanol, and 10 g. of Raney nickel catalyst prepared by the method described in Organic Synthesis, vol. 21, pp. 15 to 17, John Wiley & Sons, Inc. 1941). The autoclave was flushed with hydrogen and pressured to 1125 p.s.i.g. at 17° C. The temperature was raised to 110° C. at which time the pressure was about 1450 p.s.i.g. Heating and shaking continued for about 8 hours, during which time the temperature varied from 110–112° C. The autoclave and contents were cooled to about room temperature, vented, and the reaction mixture filtered. The filtrate was distilled through a 24-inch Vigreux fractionating column and 169.4 g. of product obtained (98.5% yield). The product was identified as β-carbethoxy-γ-valerolactone, B.P. 103–104° C./2 mm., $n_D^{25}$ 1.4469.

The above-disclosed dialkyl acylsuccinates can be reacted in an analogous manner to the above illustrative example to obtain the various disclosed γ-alkyl-β-carbalkoxy-γ-lactones.

The γ-alkyl-β-carbalkoxy butyrolactones prepared by the process of this invention are useful as plasticizers; in compounding perfumes; as high-boiling solvents; as functional fluids; and as chemical intermediates for the preparation of pharmaceuticals, dyes, biological toxicants, and the like.

We claim:

1. The process for preparing γ-alkyl-β-carbalkoxy butyrolactones having the structure

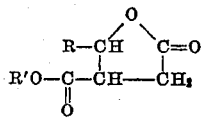

comprising hydrogenating a dialkyl acylsuccinate having the structure

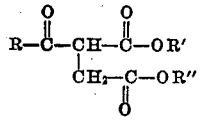

wherein R, R', and R" are alkyl radicals containing up to 20 carbon atoms, in a closed vessel at superatmospheric pressures and a temperature between about 110° C. and about 200° C. in the presence of a Raney nickel catalyst.

2. The process of claim 1, wherein the alkyl radicals contain up to 8 carbon atoms.

3. The process of claim 2, wherein superatmospheric pressures up to about 5000 p.s.i. and a Raney nickel catalyst concentration of from about 3 to about 16 weight percent, based on the dialkyl acylsuccinate, are employed.

4. The process for preparing β-carbethoxy-γ-valerolactone comprising hydrogenating diethyl acetylsuccinate in a closed vessel at superatmospheric pressures up to 5000 p.s.i. and a temperature between about 110° C. and about 150° C. in the presence of from about 3 to about 16 weight percent, based on the diethyl acetylsuccinate, of Raney nickel catalyst.

5. The process for preparing β-carbobutoxy-γ-valerolactone comprising hydrogenating dibutyl acetylsuccinate in a closed vessel at superatmospheric pressures up to 5000 p.s.i. and a temperature between about 110° C. and about 150° C. in the presence of from about 3 to about 16 weight percent, based on the dibutyl acetylsuccinate, of Raney nickel catalyst.

6. The process for preparing β-carbethoxy-γ-heptanolactone comprising hydrogenating diethyl butyrylsuccinate in a closed vessel at superatmospheric pressures up to 5000 p.s.i. and a temperature between about 110° C. and about 150° C. in the presence of from about 3 to about 16 weight percent, based on the diethyl butyrylsuccinate, of Raney nickel catalyst.

7. The process for preparing β-carbethoxy-δ-ethyl-γ-nonanolactone comprising hydrogenating diethyl (2-ethylhexanoyl)succinate in a closed vessel at superatmospheric pressures up to 5000 p.s.i. and a temperature between about 110° C. and about 150° C. in the presence of from about 3 to about 16 weight percent, based on the diethyl (2-ethylhexanoyl)succinate, of Raney nickel catalyst.

8. The process for preparing β-carbethoxy-γ-dodecanolactone comprising hydrogenating diethyl nonanoylsuccinate in a closed vessel at superatmospheric pressures up to 5000 p.s.i. and a temperature between about 110° C. and about 150° C. in the presence of from about 3 to about 16 weight percent, based on the diethyl nonanoylsuccinate, of Raney nickel catalyst.

References Cited in the file of this patent

UNITED STATES PATENTS 2,368,366   Kyrides _____ Jan. 30, 1945

OTHER REFERENCES

Adkins et al.: J. Am. Chem. Soc., vol. 55, pp. 1669–71 (1933).

Wojcik et al.: J. Am. Chem. Soc., vol. 55, pp. 4939–51 (1933).

Fichter et al.: Berichte, vol. 37, p. 1615 (1904).

Fichter et al.: Berichte, vol. 42, pp. 4707–4708 (1909).

Goldberg et al.: J. C. S., vol. 1928, p. 2356 (1928).

Adkins: Reactions of Hydrogen, p. 105 (1937).